United States Patent [19]

Yang

[11] 3,872,550
[45] Mar. 25, 1975

[54] SAFETY BELT WEBBING ADJUSTOR
[75] Inventor: Elmer Chensheng Yang, Anaheim, Calif.
[73] Assignee: Pacific Scientific Company, Anaheim, Calif.
[22] Filed: Nov. 8, 1973
[21] Appl. No.: 414,169

[52] U.S. Cl. ............................... 221/170, 24/191
[51] Int. Cl. ........................................... A44b 11/12
[58] Field of Search ............ 24/170, 134 EA, 175 E

[56] References Cited
UNITED STATES PATENTS

| 64,693 | 5/1867 | Ogier | 24/170 |
|---|---|---|---|
| 353,842 | 12/1886 | Bristol | 24/170 |
| 2,622,293 | 12/1952 | Wermlinger | 24/170 |
| 2,653,365 | 9/1953 | Elsner | 24/170 |
| 2,920,366 | 1/1960 | Pederson | 24/170 |
| 2,998,626 | 9/1961 | Prete | 24/170 |
| 3,678,542 | 7/1972 | Prete | 24/170 |
| 3,686,715 | 1/1971 | Brodnicki | 24/170 |

FOREIGN PATENTS OR APPLICATIONS

| 11,956 | 5/1897 | United Kingdom | 24/170 |

Primary Examiner—Bernard A. Gelak
Attorney, Agent, or Firm—Knobbe, Martens, Olson, Hubbard & Bear

[57] ABSTRACT

A device to adjust the length or tightness of webbing or belt material used for securing a person or an object in a designated space. The adjustor utilizes a stationary spool and a wedge member, which is in spring biased contact with the stationary spool. The wedge member is operated by a release tab. The webbing material is in contact with a substantial portion of the surface of the spool and is fed between the spool and the wedge member, which locks the webbing material securely on the spool.

1 Claim, 3 Drawing Figures

PATENTED MAR 25 1975　　　　　　　　　　　3,872,550

3,872,550

SAFETY BELT WEBBING ADJUSTOR

BACKGROUND OF THE INVENTION

This invention relates to devices used to secure objects for the prevention of possible harm or damage. More particularly, this invention is designed for use with belt or webbing mechanisms to tightly secure various objects or persons to a seat or the like. It is known in the prior art that various structrues utilizing brackets or buckle arrangements allow for the tightening of the webbing material to secure the subject in its proper place. The primary object of such mechanisms is to allow for the movement of the webbing material in one direction to tighten the belt while at the same time the bracket or buckle incorporates a mechanism which will prevent the reverse movement of the belt.

To withstand the significant force on the webbing of the belt which may be exerted by the restrained subject, prior art devices incorporate rather large and heavy components. An additional problem with present web adjustors or buckles is the inability to adequately tighten or release the web material by the use of only one hand. In most instances two hands are required to adequately release the strap or belt.

When such heavy adjustors or combination adjustor or buckle arrangements are used by an individual as in the case of a safety seat belt, the rather large and heavy components make the use of the device not only awkward, but also uncomfortable to the individual. Weight reduction is also a factor for aircraft usage, and, of course, a more economical structure is always desirable.

SUMMARY OF THE INVENTION

The present invention incorporates the use of a stationary spool mounted on a bracket, which also supports a spring biased wedge member. The webbing material is mated with substantially all of the surface area of the spool and proceeds between the spool and the wedge member, which is spring biased toward the spool, resulting in tight contact between the wedge member and the spool. The wedge member has angled teeth which lock onto the webbing material and prevent it from moving in a reverse direction once it has been pulled in the forward direction to tighten the belt around the object to be secured. Because the webbing material is in contact with nearly three-fourths of the spool surface, the forces experienced by the wedge member are much smaller than the actual force exerted on the belt adjacent the object secured. Consequently, the construction of the wedge member can be relatively small and lightweight.

The release of the webbing to loosen the belt from around the object is accomplished in a single hand motion of pulling a tab attached to the wedge member.

DETAILED DESCRIPTION OF THE INVENTION

Figure 1:
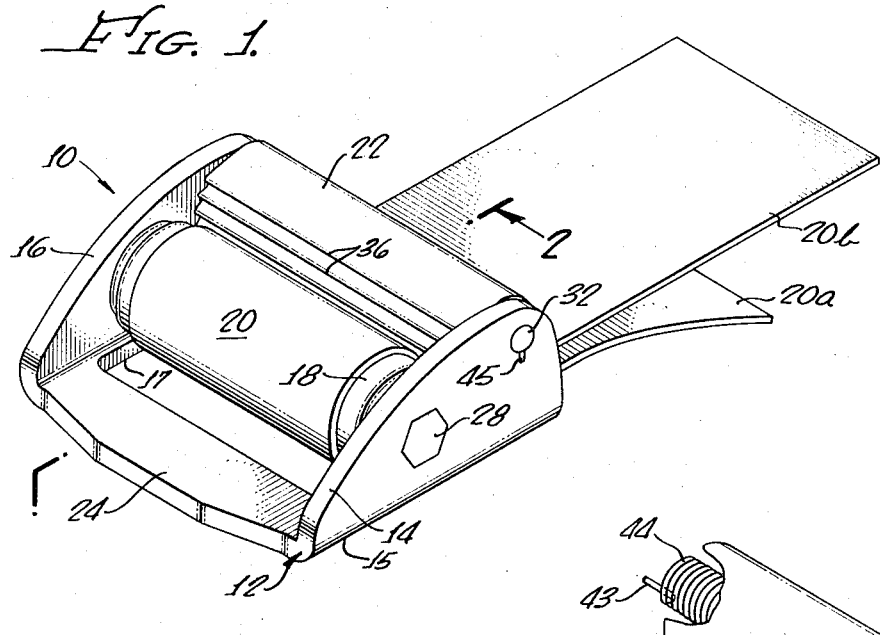
FIG. 1 is a perspective view of the webbing adjustor.

FIG. 1 shows the webbing adjustor device 10 which is comprised of a bracket or frame member 12 having two support flanges 14 and 16 with base edges 15 and 17 respectively. Mounted rigidly between the support flanges is a capstan or spool 18 upon whose surface the webbing material 20 is wound. Also connected to the frame member 12 between the support flanges 14 and 16 is a wedge member or locking member 22. The cross member 24 of the frame member 12 is anchored by conventional means not shown.

Figure 2:
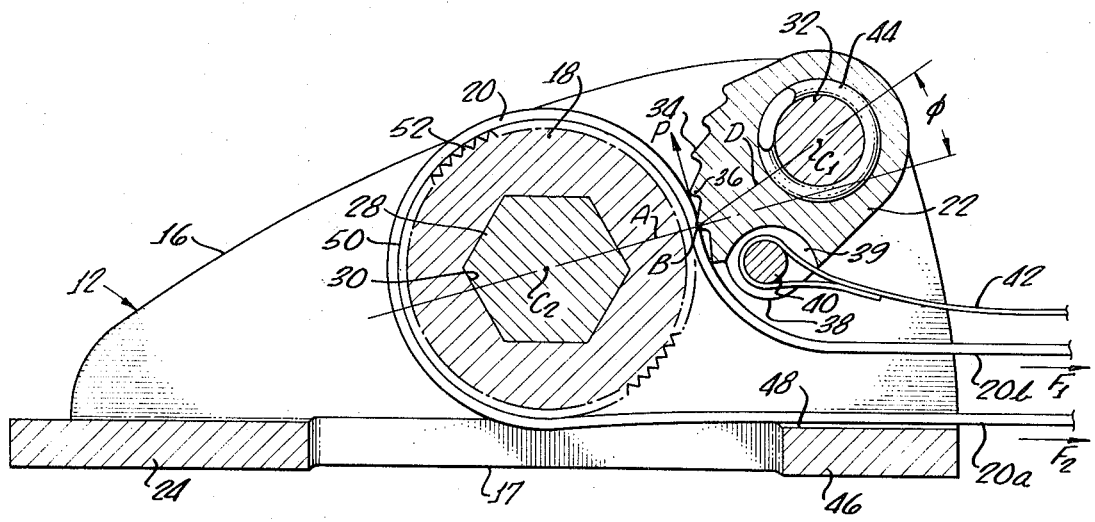
FIG. 2 is a sectional view taken along the lines 2—2 in FIG. 1.

Shown more clearly in FIG. 2, the spool 18 is mounted on a hexagonal shaft 28. The opening 30 in the spool or reel 18 is also hexagonally shaped to mate with the shaft 28, preventing any rotation relative between the shaft 28 and the spool 18. The wedge or cam member 22 is mounted on the shaft 32 to allow pivotal motion of the wedging member 22 between a locking position and a release position.

Figure 3:
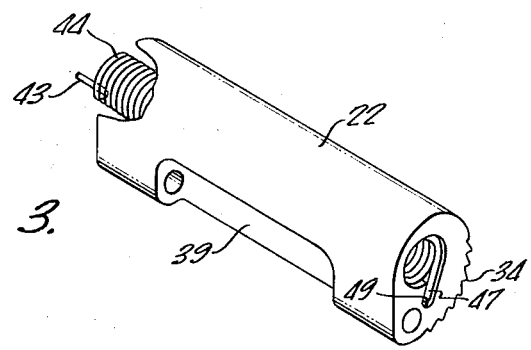
FIG. 3 is a partial cutaway view of the spring biased wedge member.

The shaft 32 of the wedge member 22 and the shaft 28 of the spool 18 are adjacent each other and are parallel. The wedge member longitudinally occupies the space between the support flanges 14 and 16 and has a corresponding contact surface 34 on one side comprised of angled teeth 36 extending between the support flanges. Having a general teardrop cross-sectional shape, the wedge member 22 has a thinner section 38 which supports a pin 40. Located in this thinner section 38 as shown in FIG. 3 is a recessed area 39 to accommodate a releasing tab 42 which is attached to the pin 40 as shown in FIG. 2. The releasing tab extends out along the webbing material 20 and is used to pull the contact surface 34 of the wedge member 22 away from the engagement or locking position with the spool 18.

The general curved shape of the contact surface 34 of the wedge member 22 is a cylindrical section whose center line would be located along the plane A somewhat to the right with respect to FIG. 2 of the general line of contact B between the wedge member 22 and the spool 18. The imaginary plane A is constructed through the center line $C_2$ of the hexagonal shaft 28 and the general line of contact B. However, in order to provide a wedging action of the wedge member 22 against the spool 18 the cylindrical section surface is pivoted about the shaft 32 which is offset above the plane A and is parallel to the hexagonal shaft 28. This offset prevents the wedge member 22 from pivoting upward beyond the line of contact B with respect to FIG. 2.

FIG. 3 shows in detail the wedge member 22 with the elongated coil spring 44 which is to be positioned around the shaft 32 (not shown in FIG. 3). One end 43 of the spring 44 is anchored in a notch 45 in the flange 14 while the other end 47 of the spring is retained in a slot 49 in the wedge member 22. The configuration of the spring 44 in regard to the relative orientation of the respective ends 47 and 49 causes the contact surface 34 of the wedge member 22 to be biased against the spool 18.

Again referring to FIG. 2, the frame member 12 has a holding bar 46 which is used to hold the portion 20a of the web material in closer contact with a greater surface area 50 (approximately 270°) of the spool 18. Because of the coefficient of friction between the webbing material 20 and the spool 18 a large force exerted in the direction of $F_2$ will be greatly reduced to a much lesser force P along the general line of contact B between the wedge member 22 and the spool 18. Since the spool 18 has teeth 52, the friction between the webbing material 20 and the spool 18 is increased. This reduction of the force in the direction of $F_2$ to the lesser force P allows for the lighter construction of the overall adjustor and more particularly the wedge member 22.

The orientation of the wedge member 22 with respect to the spool 18 is preferably such as to provide a wedge angle of about 18°. More specifically, the wedge angle is the angle $\phi$ between the plane A and the plane D, which is the imaginary plane through the center line $C_1$ of the shaft 32 and the general line of contact B between the wedge member and the spool 18 or the webbing on the spool.

This orientation between the wedge member and the spool is instrumental in providing a wedging or counter force of the wedge member 22 which will always be greater than the force P, so that the webbing material 20 will be locked on the spool 18 by the wedge member 22. Additionally, this orientation is found to be the most optimum to avoid possible jamming of the webbing under the wedge member 22. Also this arrangement allows use of webbing material of various thicknesses within a reasonable tolerance range while the wedge angle remains about the same.

Turning to the operation of the webbing adjustor, the webbing material 20 is fed over the inside surface 48 of the holding bar 46 and around the surface 50 of the spool 18 in a clockwise direction with reference to FIG. 2 and between the spool 18 and the wedge member 22 to a position shown at 20b. In order to tighten the webbing material around the object to be secured, the portion 20b is pulled to the right with respect to FIG. 2, resulting in an increased force on the webbing material portion 20a. This causes the webbing belt to become tightly secured on the object to be restrained. Because the wedge member 22 is spring biased only in the direction toward the spool 18, the movement of the webbing material 20b to the right is not restrained because the wedge member 22 with the angled teeth 36 will allow the movement of the webbing material 20. However, once the movement of the webbing material 20b to the right is stopped, movement of the webbing material in the reverse direction counterclockwise on the spool will be restrained by the locking operation of the contact surface 34 with the angled teeth or grooves 36. In addition, the spool grooves or teeth 52, when operating in conjunction with the teeth 36, tightly grip the webbing material 20 to prevent its movement in the counter-clockwise direction around the spool with respect to FIG. 2. If it is desired to have the webbing material 20 moved in the counter-clockwise direction, the operator utilizes the release tab 42 and pulls the wedge member to the right to a release position providing a sufficient space to allow the webbing material 20 to freely move in the reverse direction when a force is exerted in the direction of arrow F2. Once the tab 42 is released, the wedge member again moves to the locking position of FIG. 2 and grips the webbing material 20.

As a result of the above discussion it is apparent that the operator need use only one hand to move the webbing material 20 in the direction of the arrow F1 or in the direction of arrow F2. To tighten the webbing material around the object, the operator simply grasps that portion of the webbing shown at 20b and pulls in the direction of arrow F1. To loosen the belt the operator simply grasps the tab 42 to release the wedge member, and the force which is exerted on the web material at 20a allows the web material to move in the direction of F2, loosening the belt from the secured object.

What is claimed is:

1. A safety belt webbing adjustor comprising:
   a frame member having two spaced, upwardly extending support flanges;
   a cylindrical spool rigidly mounted between said support flanges for guiding the movement of said webbing through said frame member, the cylindrical surface of said spool being grooved to better grip the webbing;
   a wedge member having a generally teardrop shaped cross section pivotally mounted between said flanges adjacent said spool;
   an elongated coil spring concealed within said wedge member connected between the wedge member and the frame member for biasing said wedge member in contact with said spool to restrain the movement of said webbing in one direction, in a manner such that an increasing load on the webbing increases the wedging action;
   a holding bar extending between said flanges adjacent said spool and positioned to insure that the webbing is held in contact with approximately 270° of the surface of the spool as it passes from the holding bar to the wedge member; and
   a release tab attached to said wedge member centrally with respect to said frame flanges to pivot said wedge member away from said spool to allow movement of said webbing in said one direction.

* * * * *